Aug. 22, 1961 J. E. MOREAN ET AL 2,997,185
ORIENTING DEVICE
Filed Sept. 30, 1960 5 Sheets-Sheet 1

INVENTORS
James E. Morean
LaRue V. Regelman
BY
Michael Hertz
ATTORNEY

Aug. 22, 1961   J. E. MOREAN ET AL   2,997,185
ORIENTING DEVICE
Filed Sept. 30, 1960   5 Sheets-Sheet 2

INVENTORS
James E. Morean
La Rue V. Regelman
BY Michael Hertz
ATTORNEY

Aug. 22, 1961  J. E. MOREAN ET AL  2,997,185
ORIENTING DEVICE
Filed Sept. 30, 1960  5 Sheets-Sheet 3

INVENTORS
James E. Morean
LaRue V. Regelman
BY
Michael Hertz
ATTORNEY

Aug. 22, 1961

J. E. MOREAN ET AL 2,997,185

ORIENTING DEVICE

Filed Sept. 30, 1960

INVENTORS
James E. Morean
La Rue V. Regelman
BY
Michael Heitz
ATTORNEY

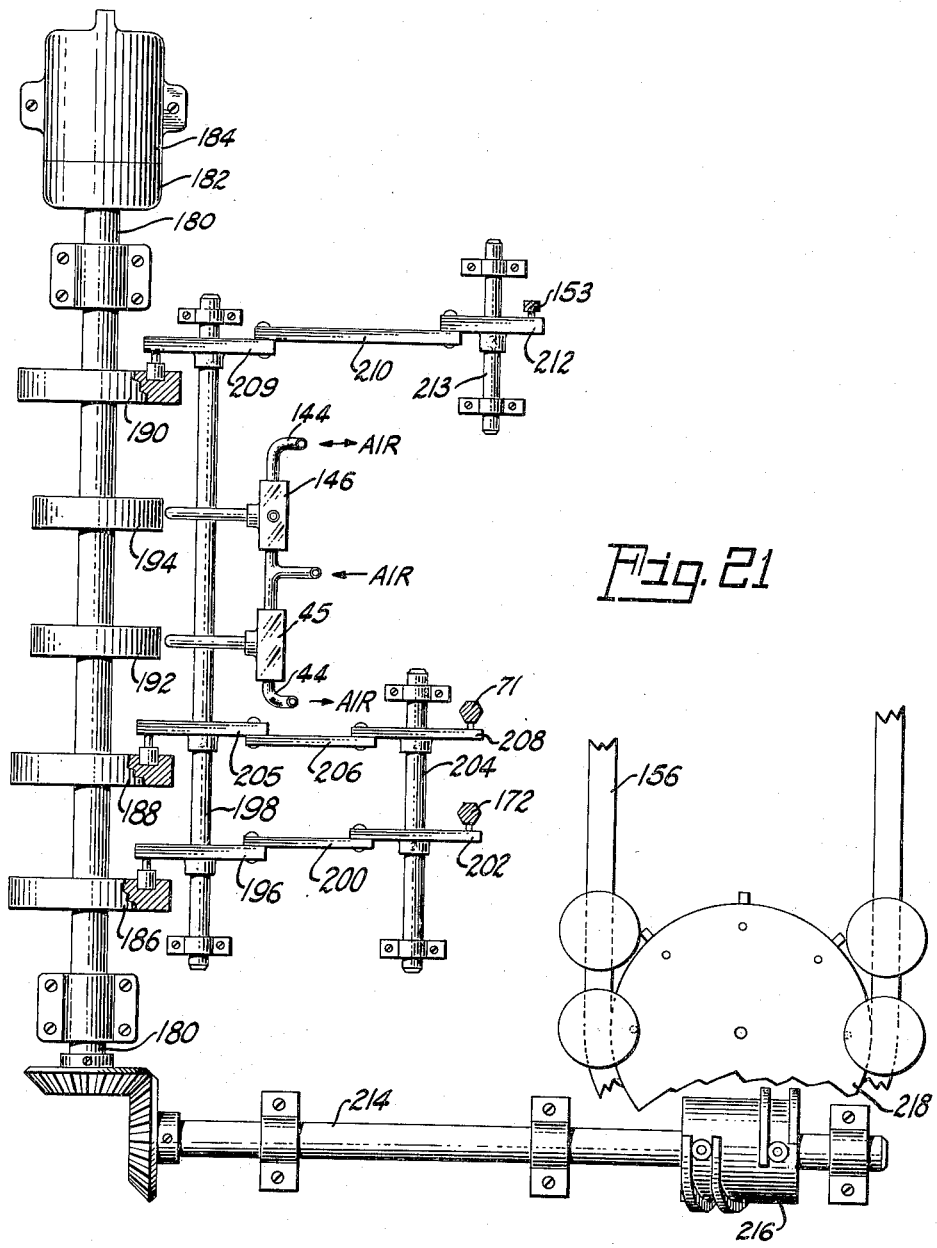

United States Patent Office 2,997,185
Patented Aug. 22, 1961

2,997,185
ORIENTING DEVICE
James E. Morean, Austin, and La Rue V. Regelman, Emporium, Pa., assignors to Sylvania Electric Products Inc., a corporation of Delaware
Filed Sept. 30, 1960, Ser. No. 59,742
12 Claims. (Cl. 214—1)

This invention relates to article orienting devices, and, in particular, for vertically aligning and rotating an article on a vertical axis.

The invention is useful in relation to machines wherein the article to be oriented is received by the device at an angle with respect to the vertical and wherein it is necessary to further rotate the article about a vertical axis prior to further operations being performed on the article.

The invention is particularly described in relation to the transfer of electron tube electrodes from an electrode delivery mechanism to a tube assembly mechanism, although it should be clear that the device is applicable to articles other than said electrodes.

The invention disclosed herein is an improvement over the orienting devices disclosed in the applications of Stanley J. Gartner and La Rue V. Regelman for Article Feed Mechanism, filed December 15, 1958, Serial No. 780,331, now Patent No. 2,970,709, and Carl W. Freeman for Grid Loading Device, filed February 20, 1959, Serial No. 794,561, now Patent No. 2,978,125, both applications being assigned to the same assignee as the instant application.

It is an object of this invention to provide a mechanism to ensure the proper orientation of the electrodes and without injury to delicate parts such as grids wound with very fine wire.

Other objects will become apparent upon further consideration of the following specification and appended claims.

In general, the invention comprises a first chute to direct the electrode to a second vertical chute with flaring mouth, in which vertical chute the electrode is rotated about its vertical axis, an underlying retractible tool having a stop to limit the rotation of the electrode, a transfer device into which the oriented electrode falls after retraction of the tool, and a needle or pusher opposite a shifted position of the transfer device to force an electrode released by the transfer device into a mica of the electron tube to be assembled.

Referring to the drawings:

FIG. 21 is a view showing the mechanism on the machine frame which drives and controls the various instrumentalities described hereinafter.

Figure 1:
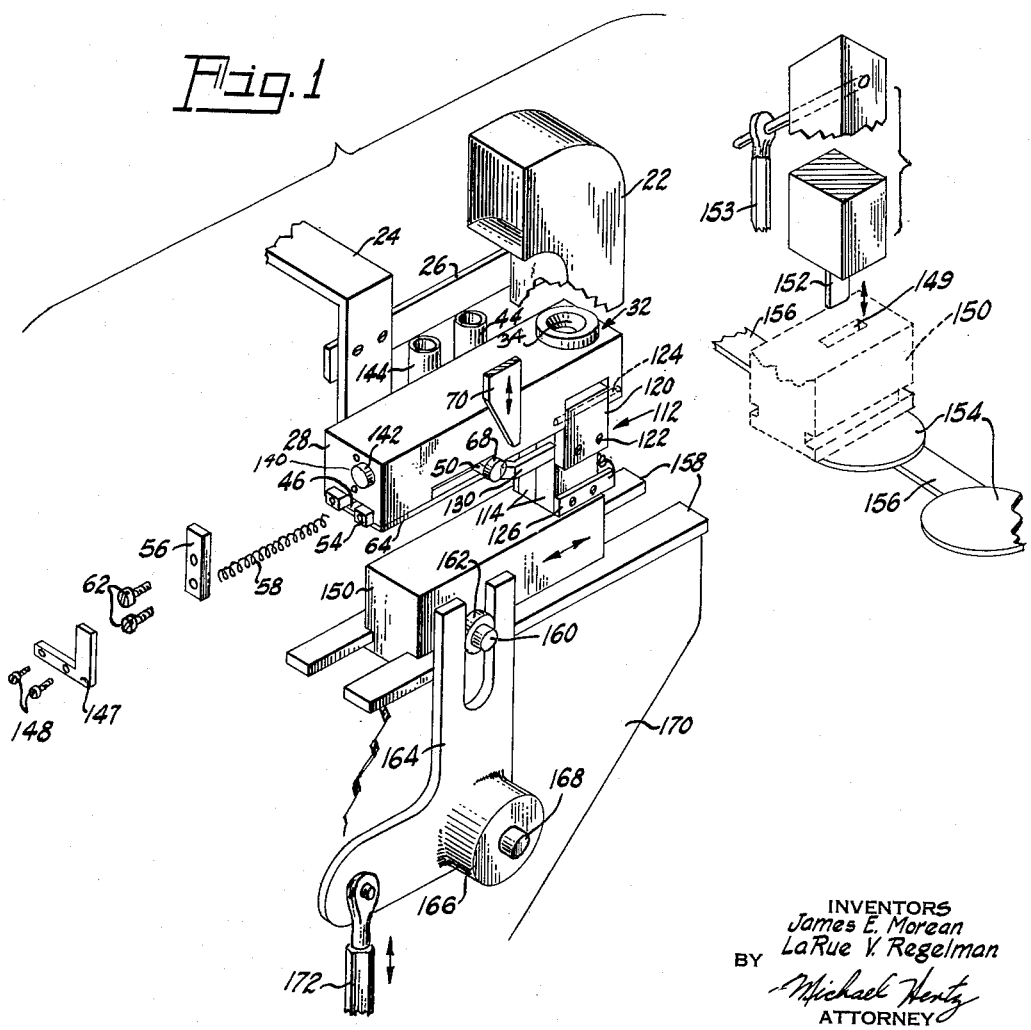
FIG. 1 is a perspective view of the orienting device, parts being broken away and other parts removed to expose otherwise hidden portions.

Now referring to the drawings in greater detail, at 22, FIG. 1, there is indicated a chute adapted to receive an electrode discharged laterally and downwardly from a delivery conveyor which may be supported in fixed relation to a bracket 24, affixed in any suitable manner to the delivery machine, the chute being secured, as by brazing, to an arm 26 also secured to the bracket 24. To the lower end of the bracket is secured a long body or block 28, substantially square in cross-section, in the forward end of which is fixedly mounted, as, for example, by set screws 30, a funnel, generically indicated as 32. The funnel has a flaring mouth 34 lying directly beneath the exit opening of the chute 22 and a vertical passage 36 of a size just slightly greater than the major diameter of the article passing therethrough and which will be oriented therein. An annular groove or manifold 38 is formed in the periphery of the funnel 32 and, see FIG. 8, non-radial or secantal ducts 40 interconnect the manifold with the central passageway. The non-radial ducts are so inclined with respect to the passageway that, when air is blown into the manifold, an article within the passageway will tend to be blown and rotate in a clockwise direction, looking down upon FIG. 8. A conduit 42 within the body 28 and connected with a pipe 44 leads to the manifold and supplies all of the ducts with air under pressure. The air in pipe 44 is under control of a valve 45 controlled by a cam on the machine.

Figure 7:
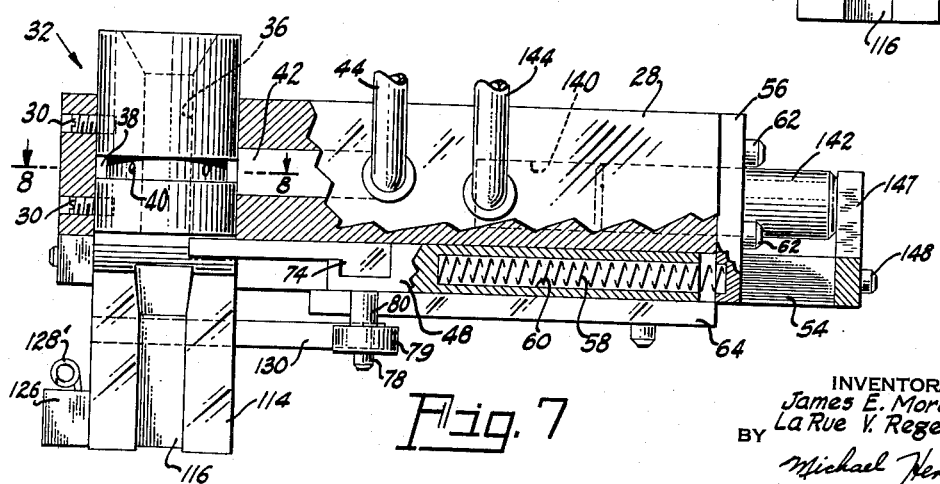
FIG. 7 is a view, partly in section and partly broken away, showing guide leaves which operate to release an electrode in the body which inadvertently may have been retained therein.
Figure 8:
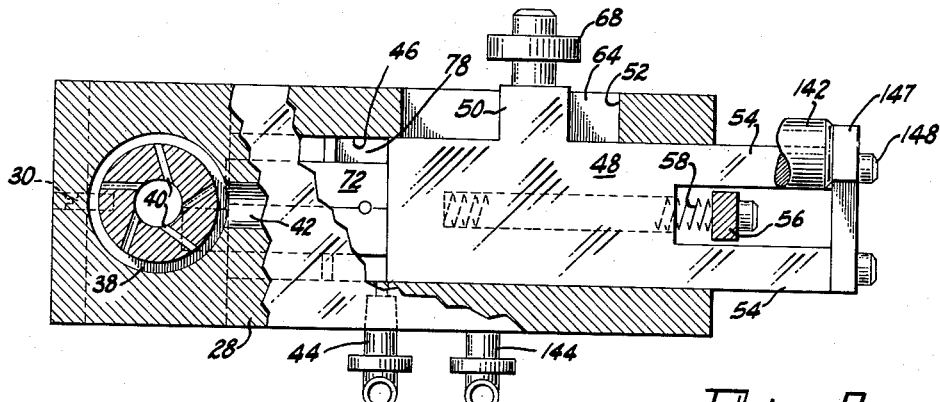
FIG. 8 is a section taken generally on the line 8—8 of FIG. 7.
Figure 9:
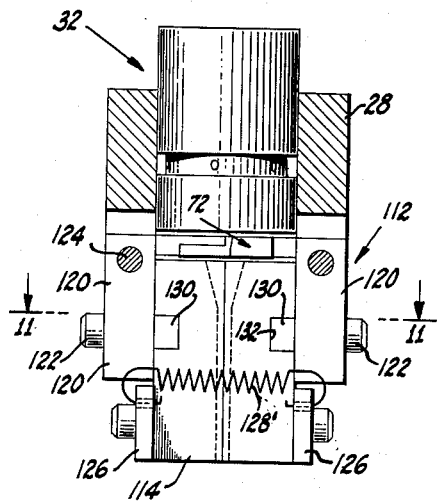
FIG. 9 is a front view of the chute, retractible tool, and transfer body, with the body sectioned to expose the chute and with chute leaves forming part of the transfer body in closed position.
Figure 10:
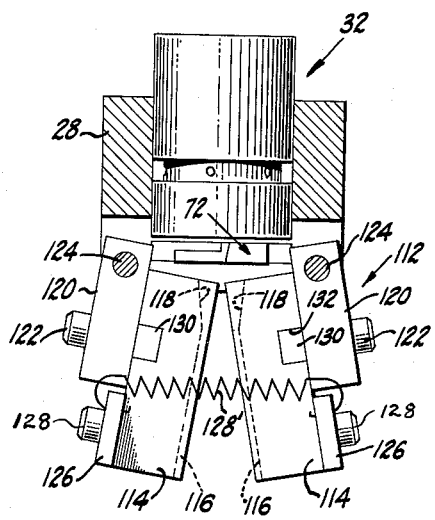
FIG. 10 is a similar view with the leaves open.

The bottom of the body is longitudinally recessed, as indicated at 46, FIGS. 1 and 8, to form a way for a slide 48, the slide being generally rectangular in plan with an ear 50 slidable in a slot 52 in the side of the body 28 and with its rear end in the form of tines 54 straddling an abutment bar 56 for a spring 58, FIGS. 7 and 8, lying within a central longitudinal recess 60 in the slide and reacting between the bar and the bottom of the longitudinal recess to drive the slide toward the left as viewed in FIGS. 7 and 8. The bar 56 is held to the body by cap screws 62 or the like. The slide is held within the recess in the bottom of the body by a pair of rail covers 64 suitably fastened to the underside of the body 28, as by screws 66. To shift the slide in a rearward direction and against the action of spring 58, the ear 50 is provided with a cam follower roller 68 in the path of vertical movement of a cam bar 70, suitably guidably supported in the frame of the machine and operated by a drive rod 71 attached to a pin 73 in the upper end of the bar.

Figure 2:
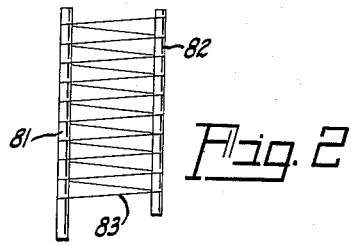
FIG. 2 is a side view of one type of article, namely a grid, which may be handled by the device.
Figure 5:
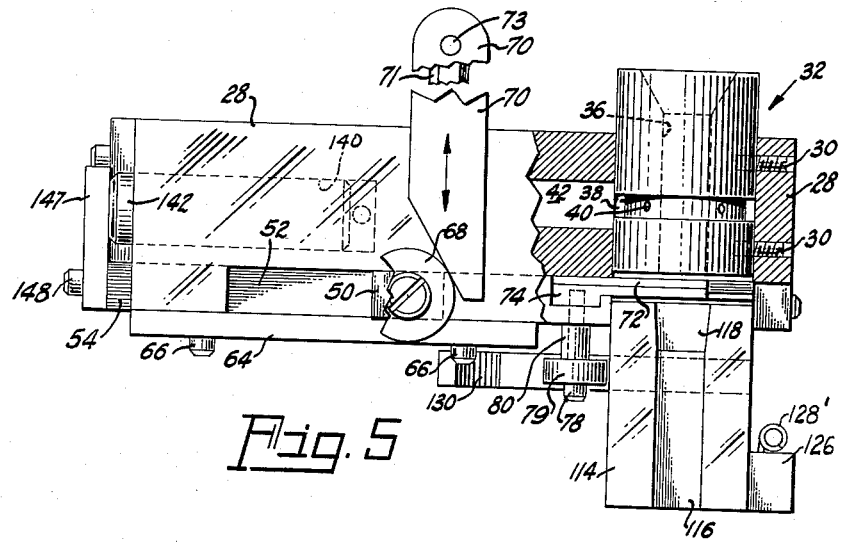
FIG. 5 is a side view of the device with parts in section showing the retractible tool in a forward position to support an electrode within the vertical chute.
Figure 6:
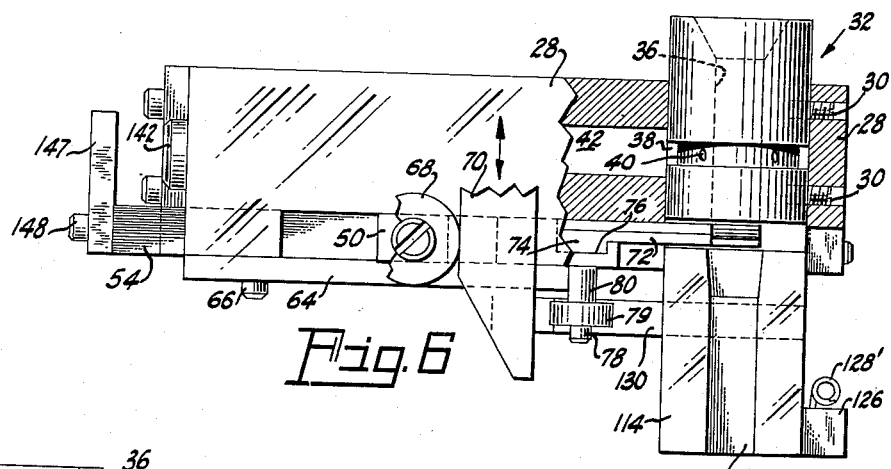
FIG. 6 is a similar view but with the retractible tool drawn to the rear and in a position to allow an electrode to drop into the transfer device beneath the tool.

At the forward end of the slide, see FIGS. 5 to 7, there is detachably mounted a slide tool 72, the tool having a butt end 74 seated in a transverse channel 76 in the forward end of the slide. The tool is held to the slide by a long screw 78 passing freely through a cam roller 79, a spacer 80, the slide 48, and into threaded engagement with the butt end 74 of the tool. The purpose of the cam roller 79 will be explained later. The tool 72 may be varied in accordance with the article oriented. As shown, the tool of FIGS. 5 to 10 is intended to orient grids similar to that shown in FIGS. 1 and 2, the grids being characterized by having two grid side rods, at 81 and 82 in FIGS. 2, which have grid lateral wires 83 secured thereto. In the formation of a grid of this type, one side rod, as side rod 81, is made longer than the other side rod, at least at one end. Advantage is taken of this lengthened side rod, in conjunction with the orienting device, to rotate the grid in the funnel to the desired position.

For orienting grids, the form of tool shown in FIGS. 12 to 17 is utilized.

Figure 4:
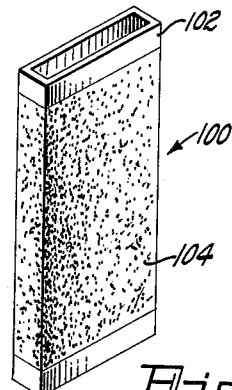
FIG. 4 is a perspective view of a second article, namely a cathode, which may be oriented by the device.
Figure 18:
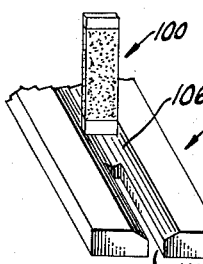
FIG. 18 is a perspective view of a tool for orienting a cathode with the cathode shown in unoriented position.
Figure 19:
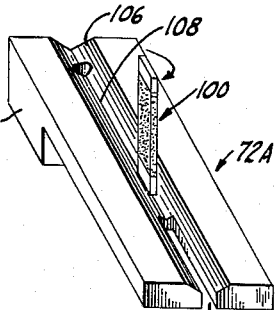
FIG. 19 is a similar view but showing the cathode in oriented position.
Figure 20:
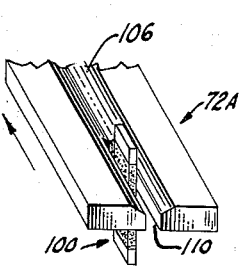
FIG. 20 is a perspective view showing the slide tool in a retracted position and the cathode in process of release.

For orienting cathodes of the type shown in FIG. 4, the form of tool shown in FIGS. 18, 19 and 20 is utilized.

Figure 13:
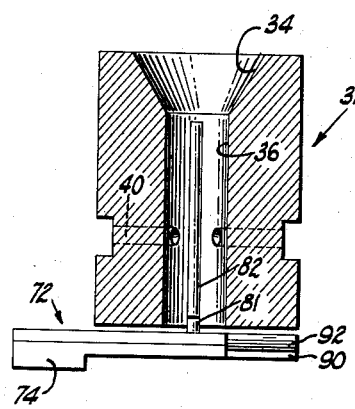
FIG. 13 is a side elevation of the tool, grid and funnel, the funnel being shown in section.
Figure 12:
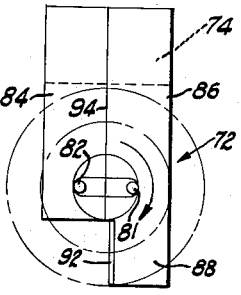
FIG. 12 is a plan view of one form of tool utilized for orienting a grid showing a grid in association with the tool.
Figure 14:
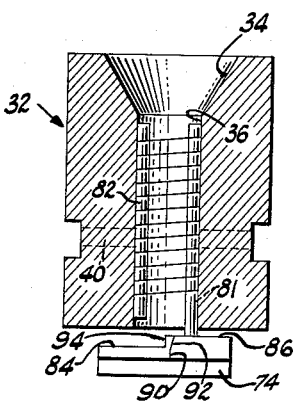
FIG. 14 is a similar view at right angles to FIG. 13.
Figure 16:
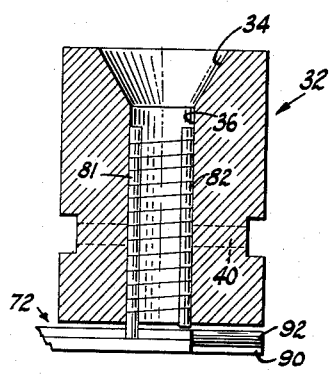
FIGS. 16 and 17 are views similar to FIGS. 13 and 14 but with the grid in oriented position.
Figure 15:
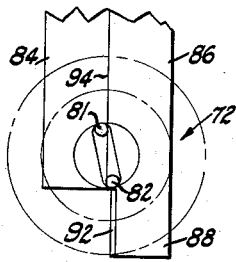
FIG. 15 is a view similar to FIG. 12 but with the grid in oriented position.
Figure 17:
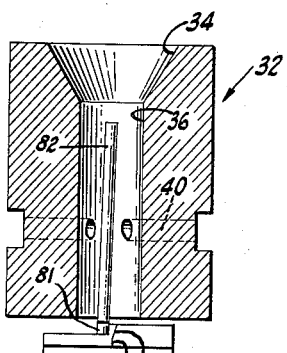

The tool of FIGS. 12 to 14 comprises at its rear end a stepped member with a lower ledge 84 and an upper ledge 86. At its forward end, the tool is narrowed, as indicated at 88 in FIG. 12, and is there provided with a short vertical edge 90 having a chamfered or beveled portion 92 leading to it.

The grid, when it drops down through the funnel 32, will come to rest with the longer side rod 81 resting on one of the ledges 84 or 86. From a consideration of FIGS. 12 to 17, it will be comprehended how, no matter in what angular position the grid initially comes to rest on the tool, it will be oriented to the position shown in FIGS. 15 to 17. After the grid comes to rest on the tool, a puff of air is blown through the pipe 44 and, because the ducts 40 are not radial, the air in engaging the side rods will rotate the grid around within the funnel until the longer side rod drops off the higher ledge 86, falls on the lower ledge 84 and slides arcuately on the lower ledge into contact with the vertical wall or riser 94 connecting the ledge 84 with the ledge 86. Thereafter, the air blast is ineffective to further rotate the grid, and the grid is therefore oriented.

Now, upon the tool 72 being retracted through action of its connected slide 48 and cam bar 70, the grid is free to fall down past the vertical wall 90, the grid being guided in its downward fall by the chamfered or beveled edge 92.

In the orientation of a cathode sleeve, such as sleeve 100, and which may comprise a rectangular in-cross-section metal sleeve 102 coated with a film of electron emissive carbonates 104, a tool, such as tool 72A in FIGS. 18 to 20, may be utilized. The tool 72A has a butt end 74A secured to the slide as in the case of tool 72, and has a groove 106 with inclined walls running longitudinally of the tool. The groove may be wide enough to accommodate within the sloping walls of the groove the width of the cathode sleeve, no matter at what angle it lands within the groove. Upon a blast of air being applied to the sleeve, it will rotate to the position shown in FIG. 19 and come to rest in the arris or deepest portion 108 of the groove. The front portion of the tool 72A is centrally longitudinally slotted from the end, as indicated at 110, to form an open-ended slot wide enough to freely allow the cathode to fall through the slide on retraction thereof.

When the electrode is released by retraction of the slide, it falls into a guide, indicated generically as 112 in FIGS. 1 and 9 to 11. The guide comprises a pair of guide leaves 114 having grooves 116 in the opposing faces of a shape and size to just accommodate an electrode, the grooves at their upper ends having flares 118 to allow for ease in reception of the electrode released from the tool. The leaves are detachably mounted on hinge plates 120 by screws 122. The hinge plates are fastened to pivots 124 rotatable in the body 28. To the lower end of each leaf is fastened a strap 126, as by screws 128, and a tension spring 128' pulls the free ends of the sleeves together. These leaves are pivoted apart against the action of spring 128' once for every cycle of operation of the orienting device, as will be explained.

To effect the separation of the leaves, each leaf is fitted with a cam finger 130 fitting in a channel 132 in the outer surface of the associated leaf, the screws 122 which hold the leaves to the hinges passing through the cam finger to secure them in place. The forward end of the cam fingers have ends 134 turned in toward each other, as clearly indicated in FIG. 11, and the cam roller 79 rides in between the cam fingers. Operation of the slide bar 48 by the cam bar 70 is insufficient to open the leaves since the roller 79 will reach only the position shown in FIG. 6, where it lies in the wide space between the cam fingers 130. However, a motor means is provided to drive the slide beyond the position shown in FIG. 6 to that shown in FIG. 7 in order that the cam roller 79 may engage the inturned ends 134 of the cam fingers and thus pivot the leaves apart. This results in any electrode which had been caught in the guide, by reason of some malformation of the electrode, to be released prior to another electrode being allowed to pass into the guide.

To operate the slide to move the cam roller to the position of FIG. 7, the following instrumentalities are employed: Within the rear end of body 28, there is a bore 140, within which is snugly but slidably fitted a piston 142. A pipe 144 supplied with air under pressure and controlled by a three-way valve 146, under control of a cam on the machine, leads to the bore 140. The bore and piston are to one side of the vertical longitudinal center of the body, as can be seen in FIG. 1, and the piston, at its outer end, is in engagement with an angled plate 147, fastened by screws 148 to the tail end of the tines 54 of the slide 48. Upon fluid pressure being applied to within the bore 140, the piston will engage the plate 148 and thrust the slide and roller 79 rearwardly to cause the roller to engage the ends 134 of the cam fingers and open the leaves. The thrust of the piston is limited by any suitable means, such as the ear 50 on the slide engaging the end wall of the slot 52.

The electrode, after it is released from the tool, drops through the guide leaves 114 and into a passage 149 in the transfer slide 150.

Figure 3:
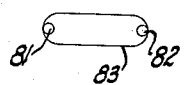
FIG. 3 is a plan view of the grid.

The function of the transfer slide is to receive an oriented electrode which has been dropped into it from the orientor and transfer it to a position to right of FIG. 1 and to a position beneath a pusher 152 vertically guided by straps on the machine frame, which pusher is driven by a rod 153, pin-connected with the pusher at the upper end thereof, to force the electrode into position in a mica 154 carried by an indexible conveyor 156. Since the transfer slide, pusher, mica and mica conveyor form no part of this invention, except in their general association with the orientor, these parts are merely shown in block form. In its simplest aspect, the electrode, as the grid of FIGS. 2 and 3, whose upper ends of the grid side rods are at an equal height, will be held by suitable tools and a shiftable bottom below the passage of the transfer slide, while the slide is shifted from where the grid is under the leaves 114 to where the grid is over a mica 154 supported on the indexible conveyor 156. The mica is pre-pierced with holes to receive the lower ends of the grid side rods and is positioned under the pusher 152, whose upper end is connected to the rod 153. When the transfer slide 150 is over the mica and under the pusher 152, the grid is released by the tools and the shiftable bottom in the transfer slide and the pusher 152 comes down, engages the tops of the grid side rods and forces the lower ends of the grid side rods down an appropriate distance through the mica. The pusher is then withdrawn and the slide 150 moves back to receive another grid. The mica, with the grid inserted therein, is then indexed to the next station and another pre-pierced mica takes its place. When the slide is fully advanced, the leaves 114 are spread apart by the action of piston 142 to dump any grid which may have been stuck in the guide.

To oscillate the transfer slide, the same is slidably mounted on rails 158 and provided with a pin 160 carrying a roller 162 engaged in the forked end of a bellcrank lever 164 having a hub 166 mounted on a pivot 168 carried by a bracket 170 of the machine. A link 172 provides a driving connection with a cam on the machine.

On the bed of the machine there is located a main drive shaft 180 driven through a Reeves transmission 182 by a motor 184. On the drive shaft are grooved cams 186, 188 and 190 and face cams 192 and 194. The grooved cam 186 has entrained therewith a follower roller on a bellcrank lever 196 mounted on a pivot shaft 198, the other end of the lever being connected by a link 200 to a second bellcrank lever 202 on a stub shaft 204, the second bell crank lever operating the link 172. In like manner, a bellcrank 205 on shaft 198 driven by the cam 188 drives a link 206, which operates a second bellcrank lever 208 on the stub shaft 204 and through it the drive rod 71; also a third bellcrank 209 on shaft 198 is driven by the cam 190 and this bellcrank, via a link 210, drives a companion bellcrank 212 on a stub shaft 213, and the bellcrank 212 in turn drives the pusher rod 153.

The cam 192 operates the valve 45 to supply air under pressure to or cut off air from line 44, while the cam 194 operates three-way valve 146 to either supply air to pipe 144 or vent the pipe.

A power take-off shaft 214, gear-connected with the shaft 180, drives an indexing drum 216, which in turn drives an indexing wheel 218, which by suitable sprockets drives the conveyor 156.

The indexing drum 216 and wheel 218 are conventional elements and may be such as are shown in the patents to R. M. Gardner et al. No. 2,637,144 or Schneider et al. 2,312,003.

The operation of the orientor will now be described: An article, such as a grid discharged from the machine to which the orientor is secured, will be propelled through the angled chute 22 and, passing through the funnel 32, will drop onto the slide tool 72 or 72A, as the case may be. In the case of a grid, the long leg 81 will strike either the ledge 84 or ledge 86. Next the cam 192 will operate to open the valve and an air blast will be blow via the pipe 44, conduit 42 in body 28, groove 38 in the funnel 32 and the ducts 40, thus blowing in air off center of the funnel passageway to rotate the grid. The grid will thus be rotated, as from the position shown in FIG. 12, to the position shown in FIG. 15. At this time the cam allows the valve 45 to close. Next the cam 188 operates, via the connecting linkage driven thereby, to pull down on drive rod 71 to cause cam bar 70 to engage the roller 68 on slide 48 to retract it and the slide tool 72 carried thereby to a position where the grid can fall off the ledge 84, the grid being guided in its fall by the vertical and bevel edges 90 and 92. It will be noted, see FIG. 15, that since the grid is slightly at an angle to the run of the riser 94, the edges 90, 92 are slightly offset from the riser 94.

The grid normally falls through the guide 112 and into the grid-holding tools in the nest or pocket 149 in the transfer slide directly therebeneath.

After this operation, the cam 186, through its driven linkage, drives the link 172 upward to shift the transfer slide to a position where the pocket in the slide is directly over the mica or other insulating spacer. Then after the grid is released from being held in the pocket by mechanism forming no part of this invention, the cam 190 operates to reciprocate the push rod 153 downward and then upwardly to push the grid side rods down through prefabricated openings in the mica.

Figure 11:
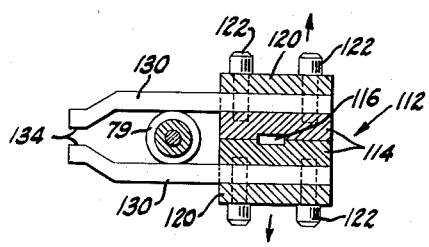
FIG. 11 is a section on the line 11—11 of FIG. 9.

During the time that the transfer slide 150 is in its forward position and with its rear end clear of the guide 112, the three-way valve 146 is operated by the cam 194 to momentarily operate the piston 142 to drive the tool slide 48 still further to the left in FIG. 6, or to the right, as viewed in FIG. 7, whereupon the cam roller 79 carried by the slide 48 will engage the inturned ends of fingers 130, see FIG. 11, and spread the leaves 114 of the guide apart to release any grid that may have been trapped by the guide. The thus released trapped grids may fall into any convenient receptacle placed below the guide. Upon release of air pressure by the three-way valve, the spring 58 returns the slide with the follower 68 against the cam bar 70, and subsequent operation of cam 188 lifts the cam bar out of contact with the roller, allowing the spring 58 to restore the slide 48 to original position. In the meantime the spring 128', across the leaves, has moved the leaves together again. The cam 190 now operates to lower the rod 153 to bring the transfer slide back to its original position to receive a new grid.

The same operation, in general, is effected with the slide tool shown in FIGS. 18 to 20.

What is claimed is:

1. An orienting device comprising a body having a substantially vertical passageway therein through which an article may pass, a duct opening into the passageway and lying at an angle thereto to direct a stream of fluid in a non-radial direction into the passageway, a slide tool beneath the passage-way and reciprocable in a horizontal plane, said slide tool having at least two article support surfaces beneath the passageway at different horizontal levels and a connecting wall therebetween, whereupon the article moving through the passageway may come to rest, depending on its orientation, on one of said surfaces, the fluid then rotating the article about its vertical axis until it is supported by the lower surface with the side of the article engaging the connecting wall to prevent further rotation of the article, and means to retract the slide tool when the article is so rotated to permit it to drop down past the tool.

2. An orientating device comprising a body having a substantially vertical passageway therein through which an article may pass, a duct opening into the passageway and lying at an angle thereto to direct a stream of fluid in a non-radial direction into the passageway, a slide tool beneath the passageway and reciprocable longitudinally in a horizontal plane, said slide tool having a stepped upper surface with a riser of the stepped surface running longitudinally of the tool, said riser being located, in an advanced position of the tool, substantially diametrically of the passageway in the body, the fluid issuing from the duct rotating the article until a side face thereof engages the riser and thereby orients the article, and means to retract the slide tool when the article is so oriented to permit it to drop past the slide tool.

3. An orienting device comprising a body having a substantially vertical passageway therein through which an article may pass, a duct opening into the passageway and lying at an angle thereto to direct a stream of fluid in a non-radial direction into the passageway, a slide tool beneath the passageway, said slide tool having a stepped upper surface, with a riser of the stepped surface running longitudinally of the tool, said tool in plan view having the higher step portion extending longitudinally beyond the lower step portion and being provided at the extending portion with a vertical wall, beveled at the top with said vertical wall offset slightly from the riser, said riser being located, in an advanced position of the tool, substantially diametrically of the passageway in the body, the fluid issuing from the duct rotating the article until a side face thereof engages the riser and thereby orients the article, the vertical wall with its beveled top assisting in the fall of the article past the slide tool, and means to retract the slide tool when the article is so oriented to permit it to drop past the slide tool.

4. An orienting device comprising a body having a substantially vertical passageway therein through which an article may pass, a duct opening into the passageway and lying at an angle thereto to direct a stream of fluid in a non-radial direction into the passageway, a slide tool beneath the passageway reciprocable longitudinally in a horizontal plane, said slide tool having a V-shaped groove running longitudinally of the tool with the arris of the groove substantially diametric of the passageway to assist in orienting the article, and means to retract the slide tool when the article is oriented to permit it to drop down past the tool.

5. An orienting device comprising a body having a substantially vertical passageway therein through which an article may pass, a duct opening into the passageway and lying at an angle thereto to direct a stream of fluid in a non-radical direction into the passageway, a slide tool beneath the passageway reciprocable longitudinally in a horizontal plane, said slide tool having a V-shaped groove running longitudinally of the tool with the arris of the groove substantially diametric of the passageway to assist in orienting the article, the forward end of the tool terminating in a slot along the line of the arris, and means to retract the slide tool when the article is so rotated to permit it to drop down past the tool.

6. An orienting device comprising a body having a substantially vertical passageway therethrough, a slide tool beneath the passageway having a top surface having elevated and deeper areas with the two areas running longitudinally of the tool, and a connecting wall between the two areas, the wall being located substantially diametrically of the passageway, said passageway being provided with means to rotate an article within the passageway and resting on the tool so as to allow it to gravitate to the deeper area and come to an oriented rest position with a side portion of the article engaging the wall, and means to reciprocate the slide tool to allow the article to drop from off the tool.

7. An orienting device comprising a body having a substantially vertical passageway therein through which an article may pass, a duct opening into the passageway and lying at an angle thereto to direct a stream of fluid in a non-radial direction into the passageway, a slide tool beneath the passageway and reciprocable in a horizontal plane, said slide tool having two article support surfaces beneath the passageway at different horizontal levels and a wall connecting the two surfaces, whereby, in conjunction with the fluid issuing from the duct, an article in the passageway may be oriented, means to retract the slide tool when the article is oriented, and a guide beneath the tool to receive the oriented article.

8. An orienting device comprising a body having a substantially vertical passageway therein through which an article may pass, a duct opening into the passageway and lying at an angle thereto to direct a stream of fluid in a non-radial direction into the passageway, a slide tool beneath the passageway and reciprocable in a horizontal plane, said slide tool having two article support surfaces beneath the passageway at different horizontal levels and a wall connecting the two surfaces, whereby, in conjunction with the fluid issuing from the ducts, an article in the passageway may be oriented, means to retract the slide tool when the article is oriented, and a guide beneath the tool to receive the oriented article, said guide having a pair of leaves forming a split passageway for the article and cooperating means on the slide tool and on the leaves effective to separate the leaves on extended retraction of the slide tool.

9. An orienting device comprising a body having a substantially vertical passageway therein through which an article may pass, a duct opening into the passageway and lying at an angle thereto to direct a stream of fluid in a non-radial direction into the passageway, a slide tool beneath the passageway and reciprocable in a horizontal plane, said slide tool having two article support surfaces beneath the passageway at different horizontal levels and a wall connecting the two surfaces, whereby, in conjunction with the fluid issuing from the ducts, an article in the passageway may be oriented, means to retract the slide tool when the article is oriented, further means to additionally retract the slide tool, a cam follower mounted on and movable with the slide tool, a guide beneath the tool to receive the oriented article, said guide having a pair of leaves forming a split passageway for the article, and a cam finger mounted on each leaf in position to be engaged by the cam follower on the additional retractive movement of the slide tool.

10. An orienting device comprising a body having a substantially vertical passageway therein through which an article may pass, a duct opening into the passageway and lying at an angle thereto to direct a stream of fluid in a non-radial direction into the passageway, a slide tool beneath the passageway and reciprocable in a horizontal plane, said slide tool having two article support surfaces beneath the passageway at different horizontal levels and a wall connecting the two surfaces, whereby, in conjunction with the fluid issuing from the ducts, an article in the passageway may be oriented, means to retract the slide tool when the article is oriented, a guide having pivoted leaves to form a passageway to receive the oriented article and allow it to pass therethrough, a transfer slide adapted to receive the article from the guide and transport it to a discharge position, interengaging means on the slide and leaves to spread the leaves apart to discharge articles caught in the guide, when the slide tool is in its most retracted position and when the transfer slide is in the forward advanced position, and means to operate the slide and transfer slide.

11. An orienting device comprising a body having a substantially vertical passageway therein through which an article may pass, a longitudinally slidable tool beneath the passageway normally in a position to block the passage of the article from movement out of the passageway, a duct having communication with a valve for conducting compressed air to said passageway, said duct being at an angle to a radius of the passageway, said tool having a raised and a lower surface with a wall connecting the two, the compressed air rotating the blocked article so that it gravitates to its lowest position on the tool and with the side of the article against the wall, the wall lying diametric of the passageway and longitudinal of the direction of movement of the tool, a spring urging the tool to its article blocking position, a slide supporting the tool, a cam follower on the slide, and a cam bar cooperative with the cam follower for moving the slide to a position where the slide tool is no longer in article blocking position, whereby the oriented article is released for fall out of the passageway.

12. An orienting device comprising a body having a substantially vertical passageway therein through which an article may pass, a longitudinally slidable tool beneath the passageway normally in a position to block the passage of the article from movement out of the passageway, a duct having communication with a valve for conducting compressed air to said passageway, said duct being at an angle to a radius of the passageway, said tool having a raised and a lower surface with a wall connecting the two, the compressed air rotating the blocked article so that it gravitates to its lowest position on the tool and with the side of the article against the wall, the wall lying diametric of the passageway and longitudinal of the direction of movement of the tool, a spring urging the tool to its article blocking position, a slide supporting the tool, a cam follower on the slide, a cam bar cooperative with the cam follower for moving the slide to a position where the slide tool is no longer in article blocking position, whereby the oriented article is released for fall out of the passageway, a guide below the body, said guide having a guideway formed in the opposing surfaces of two hinged leaves, a spring urging the leaves together, a cam finger on each leaf extending longitudinally of the leaves in the direction of retractile movement of the slide, a roller on the underside of the slide moving freely between the fingers on retractile movement of the slide by the cam bar, a cylinder and piston in the body, valve means for controlling the flow of fluid to and from the cylinder, and a plate on the slide engaged by said piston to move the roller in engagement with the cam fingers to spread the leaves apart and dump any entrained article.

No references cited.